No. 844,972. PATENTED FEB. 19, 1907.
J. R. THOMAS.
NUT LOCK.
APPLICATION FILED MAR. 20, 1906.
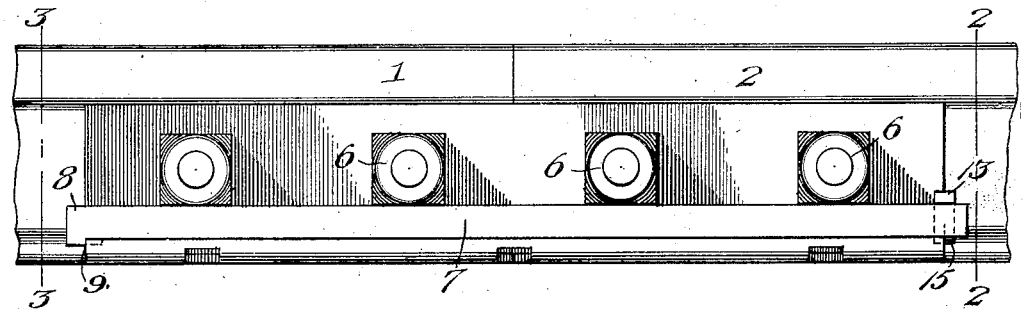
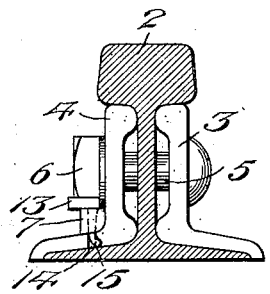
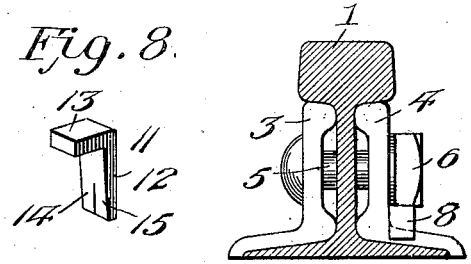
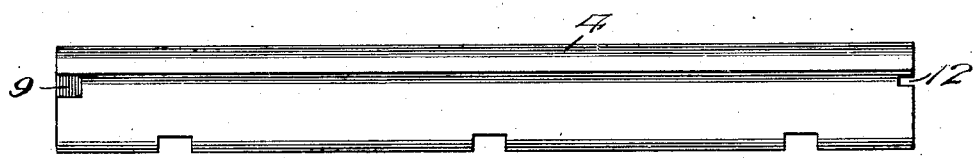
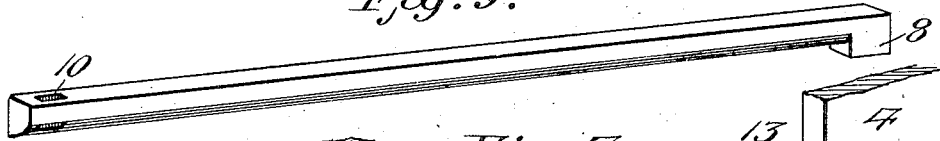
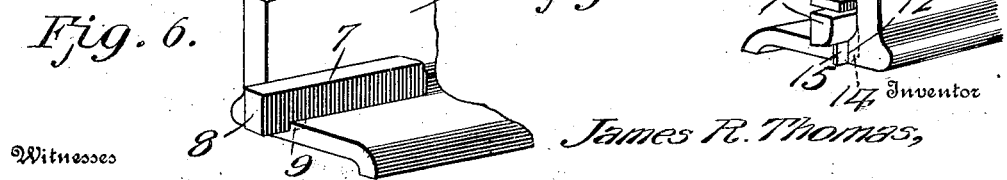
Witnesses
C. C. Hines
Frank B. Hoffman
Inventor
James R. Thomas,
By Victor J. Evans
Attorney

UNITED STATES PATENT OFFICE.

JAMES R. THOMAS, OF HUNTINGTON, WEST VIRGINIA, ASSIGNOR TO THOMAS NUT-LOCK COMPANY, OF HUNTINGTON, WEST VIRGINIA, A CORPORATION.

NUT-LOCK.

No. 844,972.   Specification of Letters Patent.   Patented Feb. 19, 1907.

Application filed March 20, 1906. Serial No. 307,106.

*To all whom it may concern:*

Be it known that I, JAMES R. THOMAS, a citizen of the United States, residing at Huntington, in the county of Cabell and State of West Virginia, have invented certain new and useful Improvements in Nut-Locks, of which the following is a specification.

This invention relates to means for locking nuts against retrograde rotation to prevent the same from working off the bolts to which they are applied, and contemplates specifically means of this character to prevent the nuts of the securing-bolts of rail-joints from becoming loose and working off and allowing the meeting ends of the rails connected by the joint to spread.

The object of the invention is to provide simple and effective means for simultaneously locking all the nuts of the securing-bolts of a joint from movement in such a manner as to permit of their ready movement when it is necessary to tighten the same or to remove the nuts for the substitution of new rails or parts of the joint in repairing the track structure.

In the accompanying drawings, Figure 1 is an outer side elevation of a rail-joint embodying my invention. Figs. 2 and 3 are sections taken, respectively, on the lines 2 2 and 3 3 of Fig. 1. Fig. 4 is a side elevation of the outer fish-plate. Fig. 5 is a perspective view of the locking-bar. Figs. 6 and 7 are respectively perspective views of the opposite ends of the outer fish-plate, showing the mode of connecting the ends of the locking-bar therewith. Fig. 8 is a detail view of the key.

Referring to the drawings, 1 and 2 represent the meeting ends of adjoining railway-rails, which are shown as united through the usual construction of joint, comprising inner and outer fish-plates 3 and 4, which are, except as to details hereinafter described, of ordinary construction. Bolts 5 pass through the webs of the rails and body portions of the fish-plates and carry nuts 6 to hold the parts in assembled relation.

A locking-bar 7 is provided for simultaneously locking the nuts against rotation. This bar seats upon the base-flange of the outer fish-plate 4 and is beveled to conform to the slope thereof and provided with an upper plane surface to bear against the lower faces of the nuts 6, thus holding them from movement. One end of the bar is provided with a holding lug or projection 8, adapted to seat within a notch or recess 9, formed in one of the ends of the base-flange of the outer fish-plate, said lug serving to hold the bar against movement in one direction. The other end of the bar is formed with a vertical passage or key-seat 10, adapted to receive a locking-key 11. The apertured end 10 of the bar projects beyond the opposite end of the outer fish-plate and has the opening 10 therein arranged to project partially beyond said end of the plate and partially in registering relation with a notch or recess 12, formed in the other end of the base-flange of said plate.

The key 11 is formed with a head 13 to bear against the upper face of the locking-bar and has a tapered shank 12 to fit within the opening 10, which is correspondingly tapered to bind the key therein. The shank 12 is longitudinally slit or incised to form a pair of tongues 14 and 15, the tongue 14 being adapted to fit within the notch or recess 12 and the tongue 15 to lie beyond the adjacent end of the outer fish-plate and to be bent inwardly at an angle to the bar to hold the key from upward movement and disconnection and the bar from longitudinal movement from the reverse direction to that against which it is held by the lug 8.

It will be understood that the bar is slipped into position beneath the nuts and between the same and the base-flange of the outer fish-plate and adjusted to seat the lug 8 in the recess 9, after which the key is applied, thus locking the bar from movement and holding the nuts from retrograde rotation. Upon removing the key the bar may be detached to permit the nuts to be tightened to compensate for wear or to be removed when repairs are to be made or the rails are to be disconnected for any other purpose. It will be apparent that the fastening is secure and that the bar cannot possibly be dislodged by any of the ordinary jolts or vibrations to which the parts are subjected in use.

Having thus described the invention, what is claimed as new is—

1. In a nut-lock, the combination with rails and fish-plates, bolts extending therethrough, and nuts applied to the bolts, of a locking-bar seated upon the base-flange of one of said fish-plates and bearing against the under sides of the nuts, one end of said bar being provided with a lug engaging one of the ends of the plate, the bar extending beyond the opposite end of said plate and being provided in its opposite end with a tapered opening, and a tapered key inserted through said opening and having a split shank, said shank forming a pair of tongues adapted to be respectively bent into engagement with the fish-plate and against the adjacent end of the same to coöperate with said lug and thereby hold the bar from movement.

2. In a nut-lock, the combination with rails and fish-plates, bolts extending therethrough, and nuts applied to the bolts, one of said fish-plates being provided with recesses at its opposite ends, of a locking-bar seated upon the base-flange of said fish-plate and bearing against the nuts, one end of the bar being provided with a lug to seat in one of said recesses and the other end thereof with a passage, and a key extending through said passage and having a pair of tongues, one of said tongues engaging the recess in the other end of the fish-plate and the other tongue being bent to bear against the end of the fish-plate to hold the bar from movement in the reverse direction and prevent displacement of the key.

In testimony whereof I affix my signature in presence of two witnesses.

JAMES R. THOMAS.

Witnesses:
JAMES H. REYNOLDS,
JAMES D. BIGGS.